United States Patent
Tamaru et al.

(10) Patent No.: US 8,284,264 B2
(45) Date of Patent: Oct. 9, 2012

(54) IMAGING APPARATUS, METHOD, AND PROGRAM

(75) Inventors: Masaya Tamaru, Asaka (JP); Masahiko Sugimoto, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 908 days.

(21) Appl. No.: 11/857,734

(22) Filed: Sep. 19, 2007

(65) Prior Publication Data
US 2008/0068466 A1    Mar. 20, 2008

(30) Foreign Application Priority Data
Sep. 19, 2006  (JP) .................................. 2006-252221

(51) Int. Cl.
H04N 5/228  (2006.01)

(52) U.S. Cl. ......... 348/208.99; 348/207.99; 348/333.01; 348/222.1

(58) Field of Classification Search ............. 348/208.99, 348/207.99, 333.01, 222.1
See application file for complete search history.

(56) References Cited

U.S. PATENT DOCUMENTS

| | | | |
|---|---|---|---|
| 7,027,087 B2 * | 4/2006 | Nozaki et al. ............ | 348/231.99 |
| 7,248,300 B1 | 7/2007 | Ono | |
| 2004/0170397 A1 * | 9/2004 | Ono .............................. | 386/117 |
| 2006/0092292 A1 | 5/2006 | Matsuoka et al. | |

FOREIGN PATENT DOCUMENTS

| | | |
|---|---|---|
| JP | 03-036886 | 2/1991 |
| JP | 11-136557 | 5/1999 |
| JP | 2003-092701 A | 3/2003 |
| JP | 2003-244487 A | 8/2003 |
| JP | 2005-020446 A | 1/2005 |
| JP | 2006-5662 A | 1/2006 |
| JP | 2006-115406 A | 4/2006 |
| JP | 2006-222883 A | 8/2006 |

OTHER PUBLICATIONS

CN First Office Action, dated Mar. 29, 2010, issued in corresponding Chinese Application No. 200710145477.9, 7 pages including partial English translation.

* cited by examiner

*Primary Examiner* — Yogesh Aggarwal
(74) *Attorney, Agent, or Firm* — Sughrue Mion, PLLC

(57) ABSTRACT

An imaging apparatus capable of reliably obtaining and recording an image that satisfies a predetermined condition. When a continuous imaging mode is set through an operation system, an image is obtained through continuous imaging, and a determination is made as to whether or not the image obtained through the continuous imaging satisfies the predetermined condition. If the image is determined to satisfy the predetermined condition, the imaging is terminated and the image satisfying the predetermined condition is recorded.

12 Claims, 12 Drawing Sheets

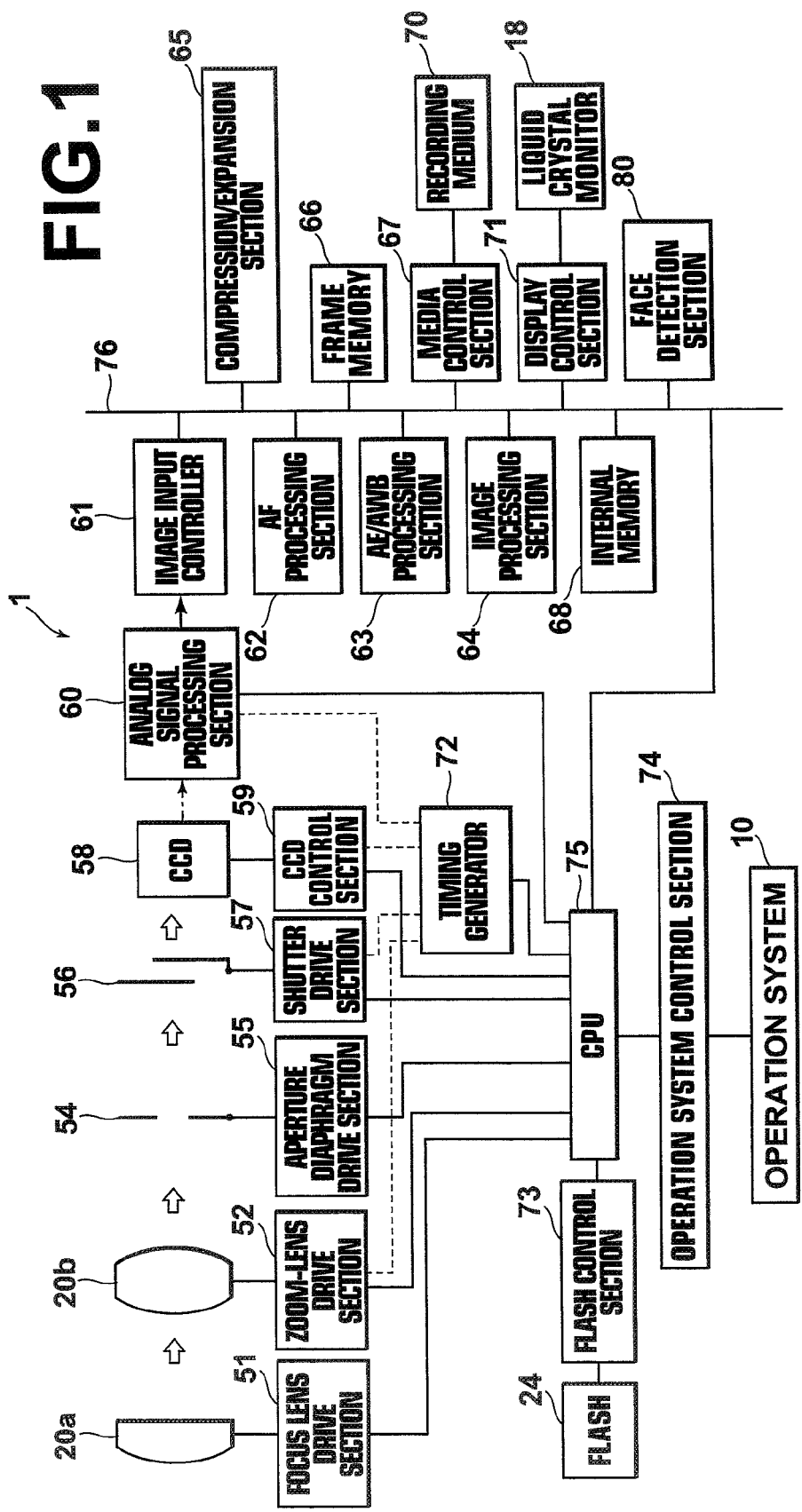

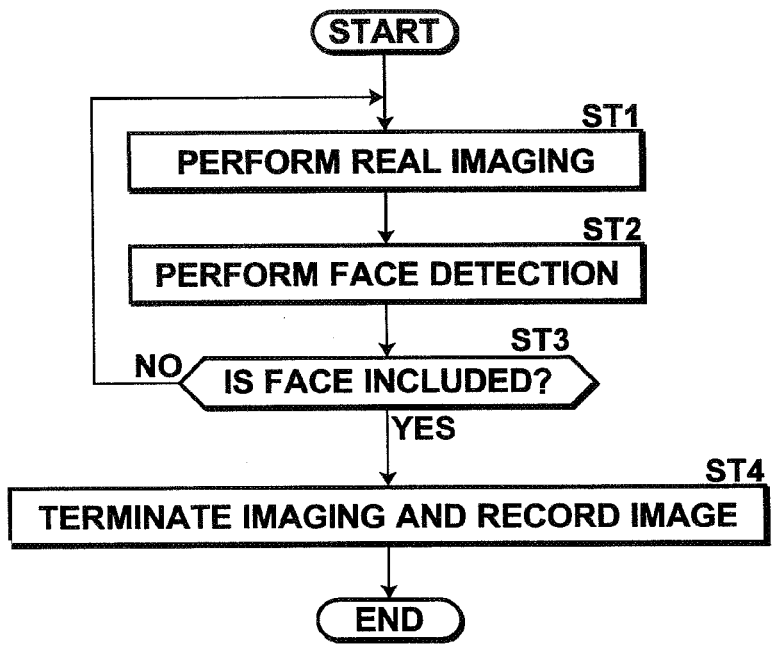
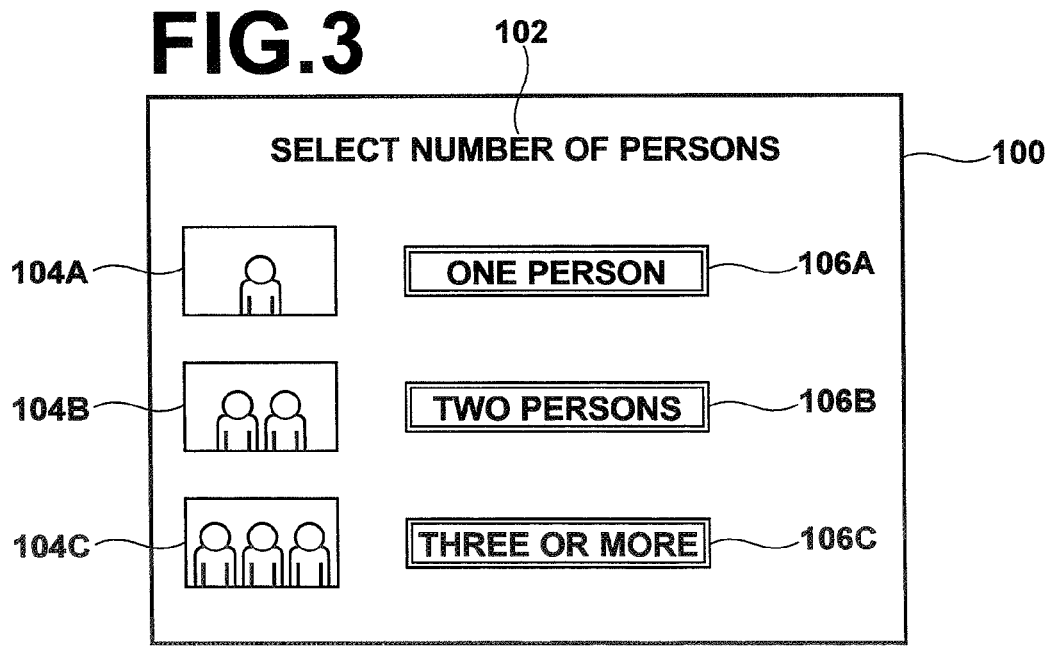

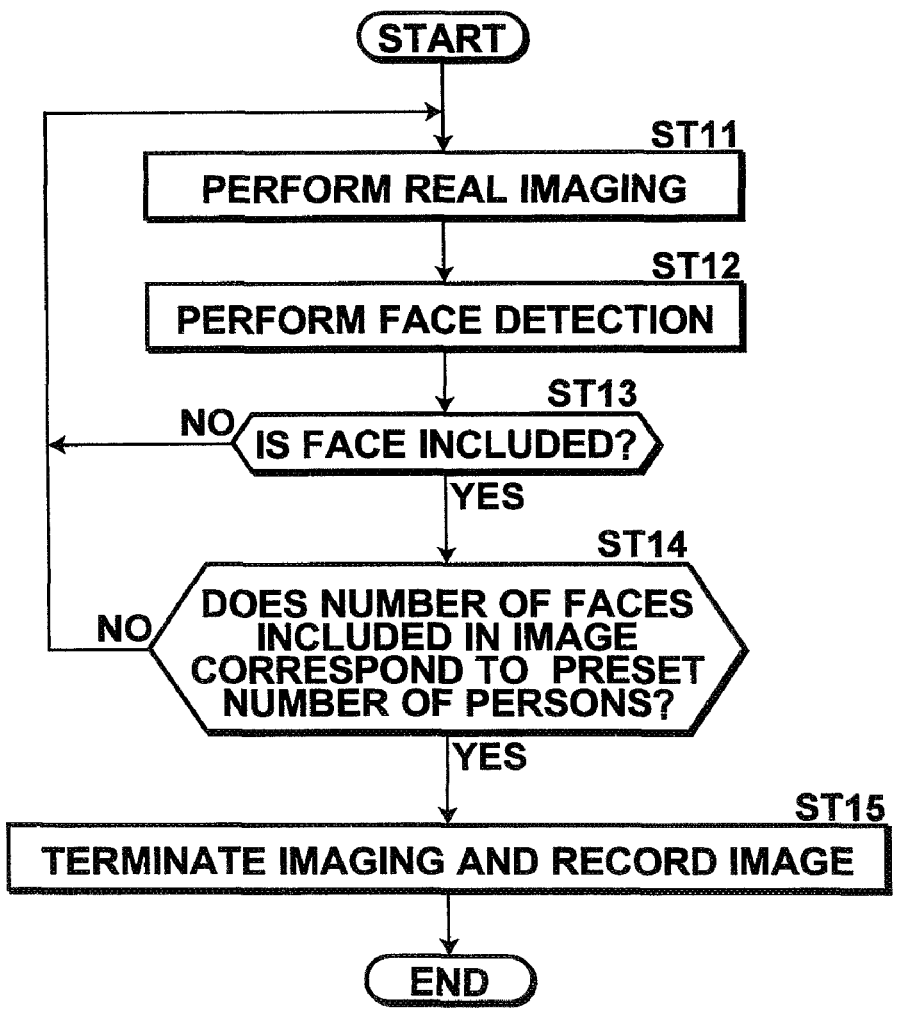

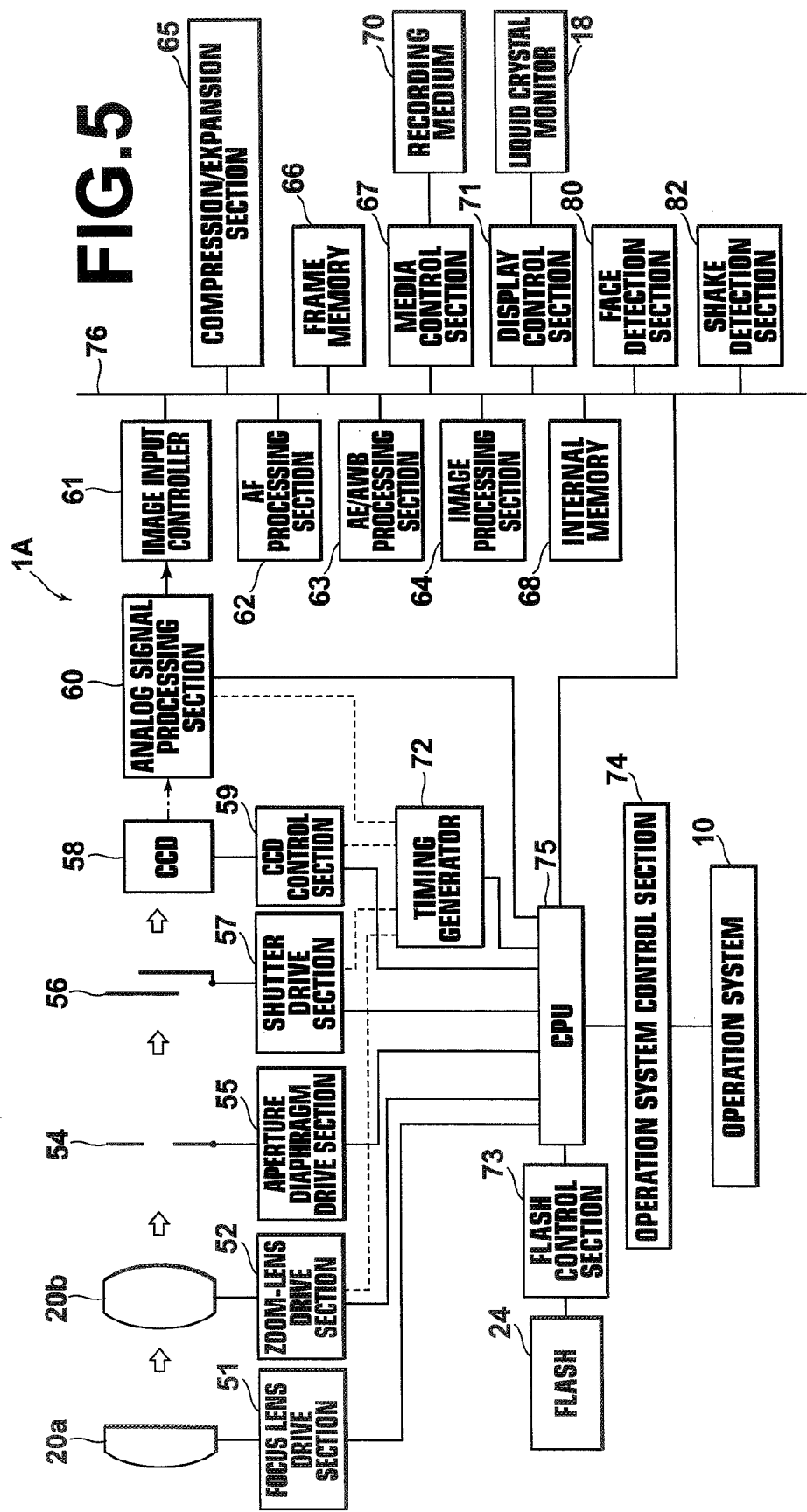

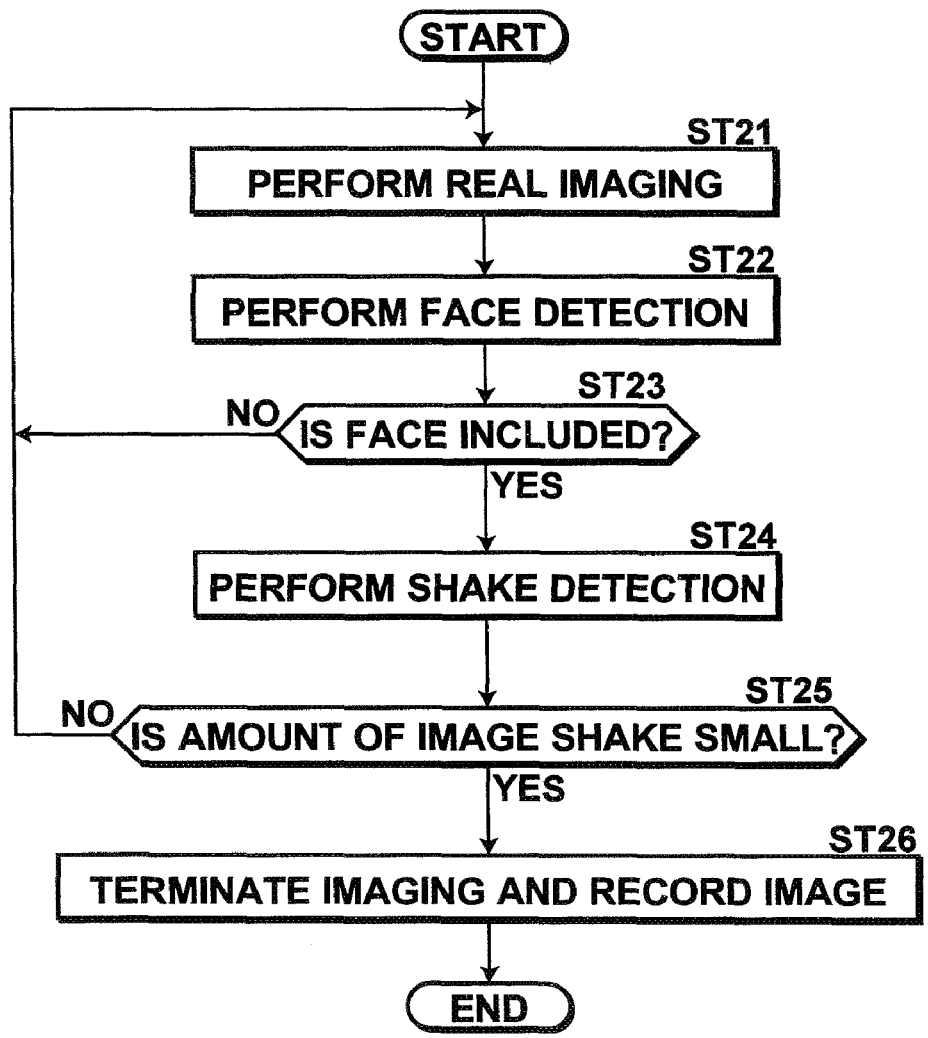

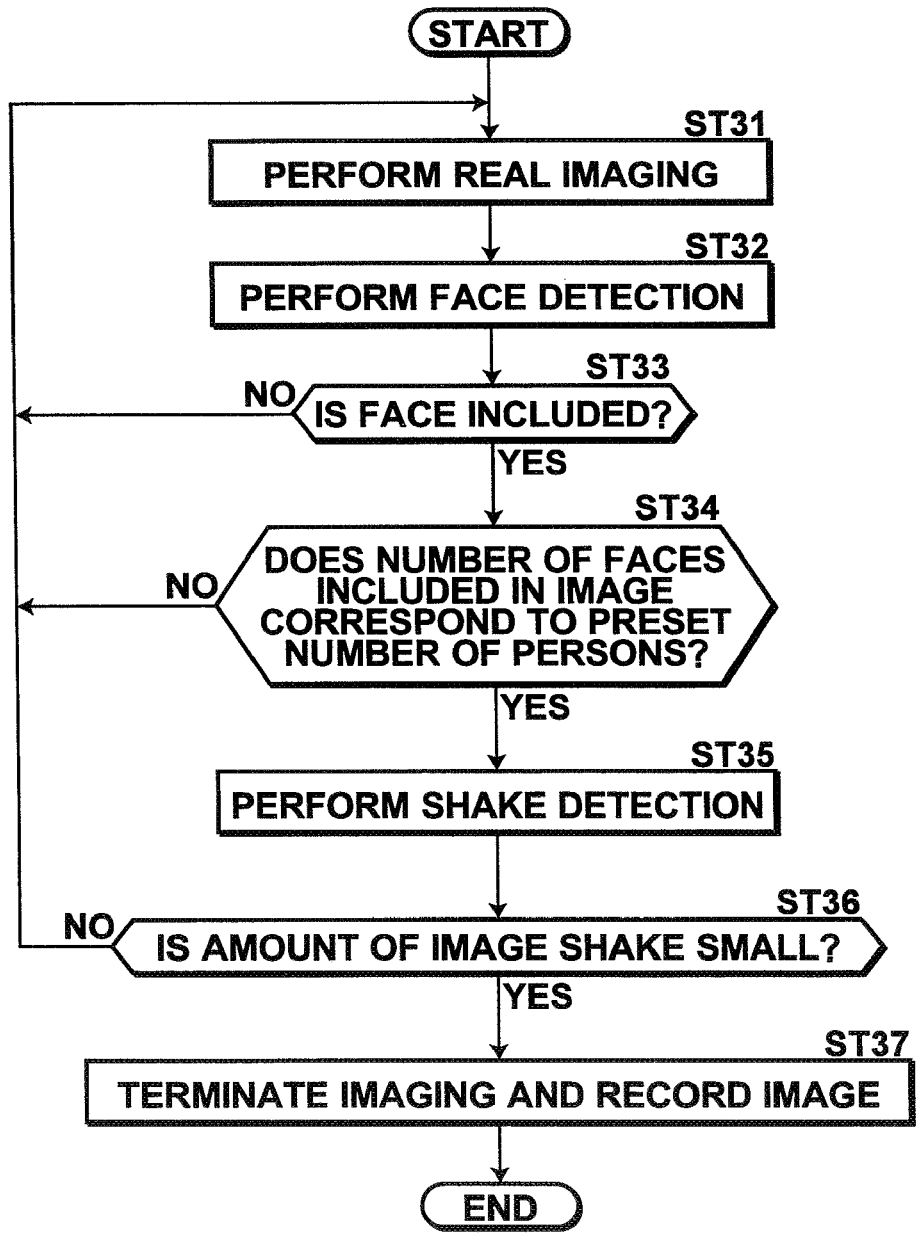

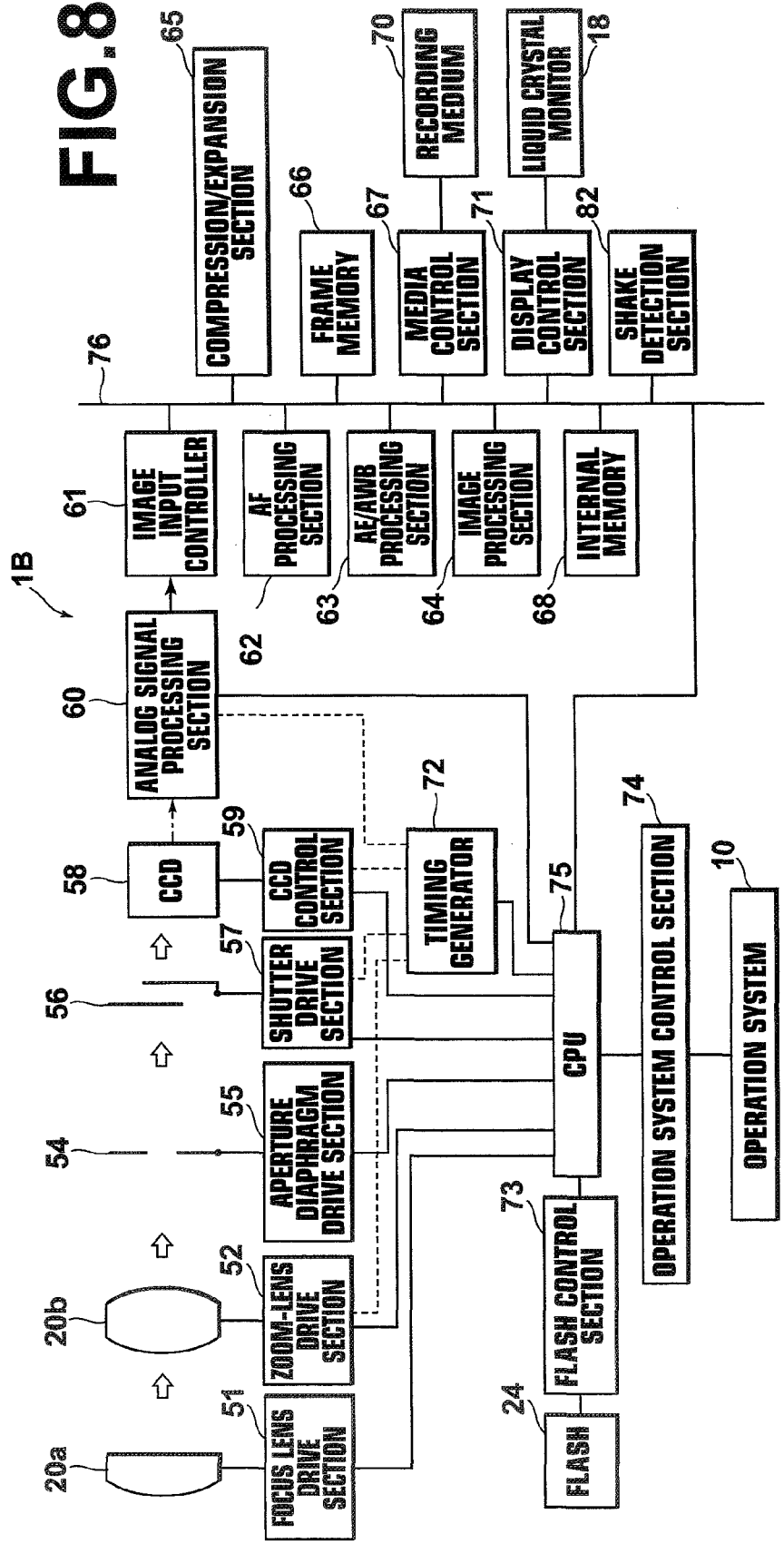

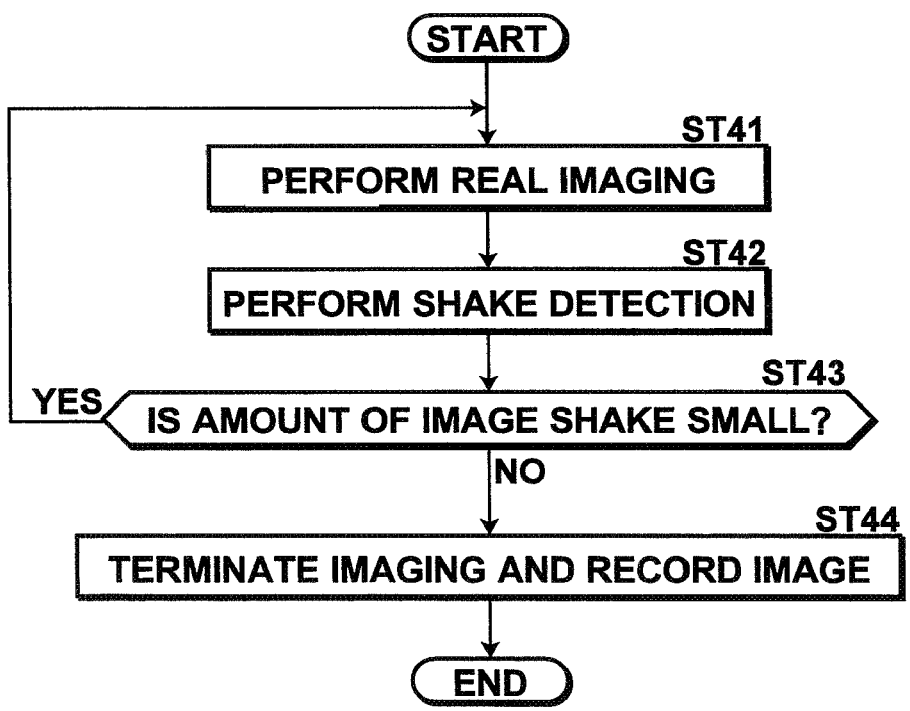

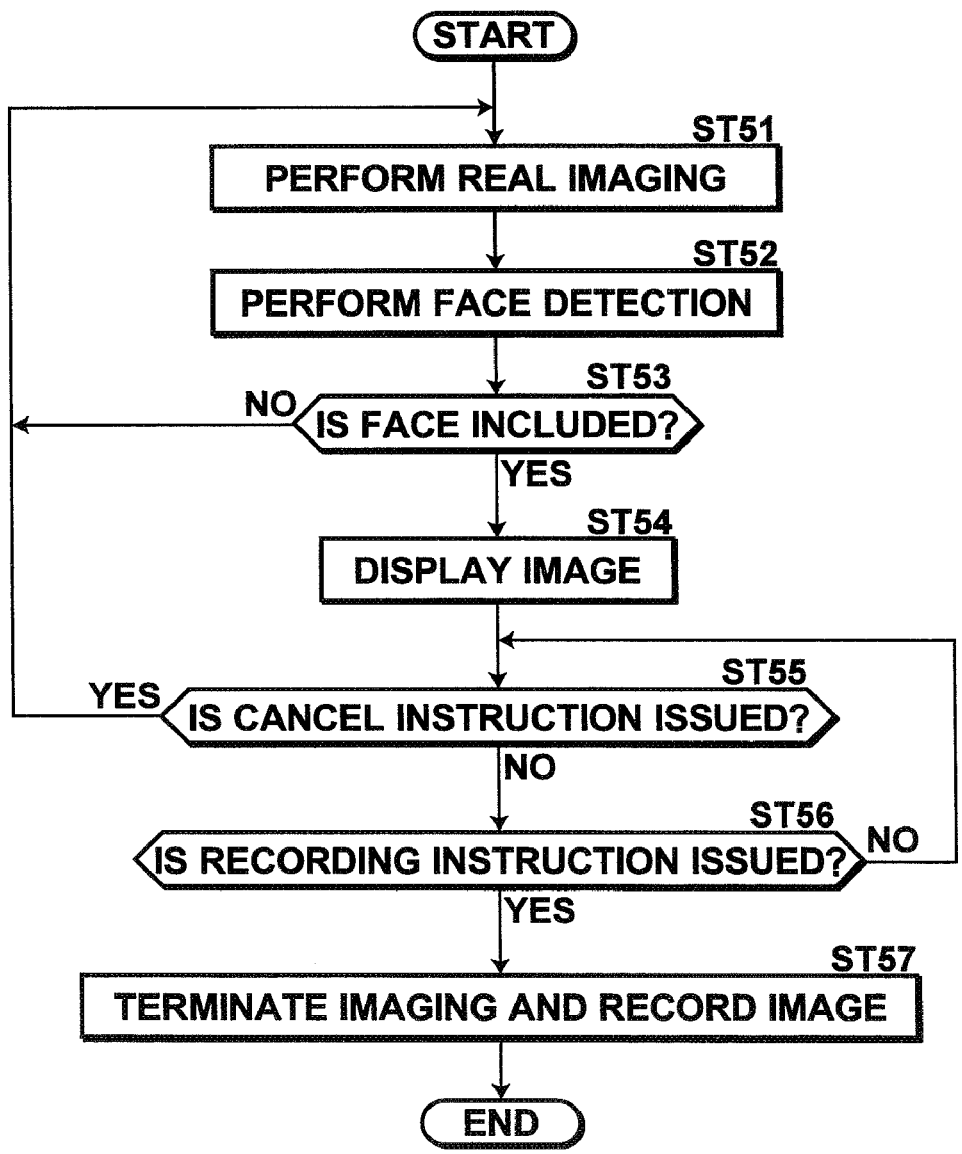

IMAGING APPARATUS, METHOD, AND PROGRAM

BACKGROUND OF THE INVENTION

1. Field of the Invention

The present invention relates to an imaging apparatus and method. The present invention also relates to a program for causing a computer to execute the imaging method.

2. Description of the Related Art

When imaging persons as subjects, image correction techniques used for correcting the person's faces to make them satisfactory are known. Image corrections, however, require sophisticated techniques. For example, it is difficult to correct an image taken when a person just blinked to an image of the person not blinking, or to correct an image of a person not smiling to an image of the person looking like smiling.

For this reason, for example, an imaging apparatus that performs imaging when a predetermined condition, such as open eyes after closing for two seconds, not closed eyes, or the like, is satisfied by a subject is proposed as described, for example, in U.S. Pat. No. 7,248,300 and U.S. Patent Application Publication No. 20040170397. Another type of imaging apparatus is also proposed as described, for example, in Japanese Unexamined Patent Publication No. 2006-005662, in which imaging is performed when movement of a face, the subject of the imaging, is within a predetermined region during a predetermined time period, that is, when the subject is ready to be imaged. According to these imaging apparatuses, a satisfactory image of a person's face may be obtained without correcting the image.

The apparatuses described in the aforementioned patent publications perform imaging when the subjects are in a predetermined condition. Here, in an imaging apparatus, a time lag occurs between the initiation of an imaging operation and real imaging through the release of the shutter. Therefore, there may be a case in which an image that includes a subject satisfying a predetermined condition is not obtained if the subject moves, or closes the eyes at the moment of imaging performed during the time period from the time when the predetermined condition is satisfied by the subject to the time when the imaging is actually performed. In particular, if the subject moves, a blurred image, like a camera shake image, may be obtained. Further, when performing so-called self-image taking, in which the imaging is performed with the lens directed toward oneself, it is difficult to verify whether or not own image is within the field angle of the imaging apparatus, since the monitor for verifying the image is disposed on the rear side of the imaging apparatus.

SUMMARY OF THE INVENTION

The present invention has been developed in view of the circumstances described above, and it is an object of the present invention to provide a method and apparatus capable of reliably obtaining an image that satisfies a predetermined condition.

The imaging apparatus of the present invention is an apparatus, including:
 an imaging means for obtaining an image through imaging;
 a recording means for recording the image;
 an operation means for accepting various setting operations, including setting of a continuous imaging mode, performed by a photographer; and
 a control means for controlling the imaging means and the recording means when the continuous imaging mode is set through the operation means so that the following are performed: obtaining an image through continuous imaging; determining whether or not the image obtained through the continuous imaging satisfies a predetermined condition; and terminating the continuous imaging if the image is determined to satisfy the predetermined condition, and recording the image satisfying the predetermined condition on the recording means.

The referent of "continuous imaging mode" as used herein means is an imaging mode in which imaging is performed continuously without the release button being depressed, and an image is obtained sequentially.

The imaging apparatus of the present invention may further includes a face detection means for determining whether or not the image includes a face, and the predetermined condition may be a condition that the image should include a face.

In this case, the apparatus may further include a shake detection means for detecting an amount of shake of the image, and the predetermined condition may be a condition that an amount of shake of the image determined to include a face should be smaller than a predetermined threshold value.

In the imaging apparatus of the present invention, the operation means may be a means for further accepting setting of the number of persons, and the predetermined condition may be a condition that the number of faces included in the image determined to include a face should correspond to the specified number of persons.

In this case, the apparatus may further includes a shake detection means for detecting an amount of shake of the image, and the predetermined condition may be a condition that an amount of shake of the image determined to include the number of faces corresponding to the specified number of persons should be smaller than a predetermined threshold value.

In the imaging apparatus of the present invention, the face detection means may be a means for determining that the image includes a face if the face is positioned in a predetermined position within the image.

Further, in the imaging apparatus of the present invention, the face detection means may be a means for detecting a face component of a face included in the image, and determining that the image includes the face if the face component has a predetermined shape.

The imaging apparatus of the present invention may further includes a shake detection means for detecting an amount of shake of the image, and the predetermined condition may be a condition that an amount of shake of the image should be smaller than a predetermined threshold value.

The imaging apparatus of the present invention may further includes a display means for displaying the image, and the control means may be a means for causing the display means to display the image to be recorded on the recording means to accept an instruction as to whether or not to record the displayed image on the recording medium, and causing the image to be recorded on the recording medium if instructed to record the image, while causing the imaging to be continued if instructed not to record the image.

An imaging method of the present invention is a method for use with an imaging apparatus that includes an imaging means for obtaining an image through imaging, and a recording means for recording the image, the method comprising the steps of:
 obtaining an image through continuous imaging when a continuous imaging mode is set by a photographer;
 determining whether or not the image obtained through the continuous imaging satisfies a predetermined condition; and terminating the continuous imaging if the image is determined to satisfy the predetermined condition, and recording the image satisfying the predetermined condition on the recording means.

The imaging method of the present invention may be provided in the form of a program for causing a computer to execute the method.

According to the present invention, when a continuous imaging mode is set, an image is obtained through continuous imaging, and a determination is made as to whether or not the image obtained through the continuous imaging satisfies a predetermined condition. Then, if the image is determined to satisfy the predetermined condition, the imaging is terminated, and the image satisfying the predetermined condition is recorded. This may eliminate the time lag from the time when a predetermined condition is satisfied to the time when the imaging is actually performed, as seen in imaging apparatuses described in U.S. Pat. No. 7,248,300, U.S. Patent Application Publication No. 20040170397, and Japanese Unexamined Patent Publications No. 2006-005662, and thereby an image satisfying a predetermined condition may be obtained reliably.

If the predetermined condition is a condition that the image should include a face, an image including a face may be obtained reliably. In particular, when a self-image taking is performed, a self-image may be obtained reliably, if the predetermined condition is a condition that the image should include a face.

In this case, if the predetermined condition is a condition that an amount of shake of the image determined to include a face should be smaller than a predetermined threshold value, an image including the face with less amount of shake may be obtained.

Further, if the predetermined condition is a condition that the number of faces included in the image determined to include a face should correspond to the specified number of persons, an image including the specified number of persons may be obtained reliably.

In this case, if the predetermined condition is a condition that an amount of shake of the image determined to include the number of faces corresponding to the specified number of persons should be smaller than a predetermined threshold value, an image including the specified number of persons with less amount of image shake may be obtained.

Further, if a configuration is adopted in which an image is determined to include a face when the face is positioned in a predetermined position within the image, a good-looking image with the face located in the predetermined position may be obtained.

Still further, if a configuration is adopted in which an image is determined to include a face if a face component of the face included in the image has a predetermined shape.

Further, if the predetermined condition is a condition that an amount of shake of the image should be smaller than a predetermined threshold value, an image with less amount of shake may be obtained.

Still further, if a configuration is adopted in which an image satisfying a predetermined condition is displayed to accept an instruction as to whether or not to record the displayed image on the recording medium, an image desired by a photographer may be obtained.

BRIEF DESCRIPTION OF THE DRAWINGS

FIG. 1 is a schematic block diagram of a digital camera to which the imaging apparatus according to a first embodiment of the present invention is applied, illustrating the construction thereof.

FIG. 2 is a flowchart illustrating a process performed in the first embodiment.

FIG. 3 illustrates a screen for setting the number of persons,

FIG. 4 is a flowchart illustrating a process performed in a second embodiment.

FIG. 5 is a schematic block diagram of a digital camera to which the imaging apparatus according to a third embodiment of the present invention is applied, illustrating the construction thereof.

FIG. 6 is a flowchart illustrating a process performed in the third embodiment.

FIG. 7 is a flowchart illustrating a process performed in a fourth embodiment.

FIG. 8 is a schematic block diagram of a digital camera to which the imaging apparatus according to a fifth embodiment of the present invention is applied, illustrating the construction thereof.

FIG. 9 is a flowchart illustrating a process performed in a fifth embodiment.

FIG. 10 is a flowchart illustrating a process performed in a sixth embodiment.

DESCRIPTION OF THE PREFERRED EMBODIMENTS

Figure 11:
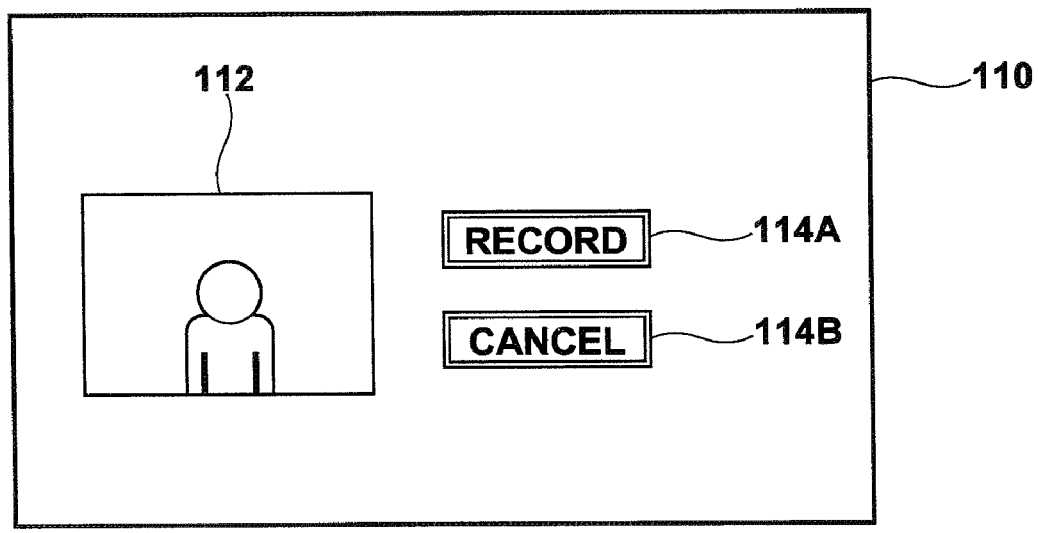
FIG. 11 illustrates an image display screen.

Hereinafter, exemplary embodiments of the present invention will be described with reference to the accompanying drawings. FIG. 1 is a schematic block diagram of a digital camera to which the imaging apparatus according to a first embodiment of the present invention is applied, illustrating the construction thereof. The digital camera 1 shown in FIG. 1 converts image data obtained by imaging to an Exif image file, and records the image file on a recording medium 70 detachably attached to the main body.

The digital camera includes: an operation system 10 including an operation mode switch, a menu/OK button, a zoom-lever, an up-down arrow button, a back (return) button, a display switching button, a release button, a power switch, and the like; and an operation system control section 74, which is an interface section for transferring operational contents of these switches to a CUP 75.

In the present embodiment, a continuous imaging mode, in which imaging is performed continuously without the release button being depressed and an image is obtained sequentially, is available as an operation mode, in addition to an imaging mode and a playback mode.

The optical system includes a focus lens 20a and a zoom-lens 20b. The lenses 20a and 20b are movable in the optical axis directions by a focus lens drive section 51 and a zoom-lens drive section 52 respectively, each of which including a motor and a motor driver. The focus lens drive section 51 controls movement of the focus lens 20a based on focus drive amount data outputted from an AF processing section 62. The zoom-lens drive section 52 controls movement of the zoom-lens 20b based on data of operated amount in the zoom-lever.

An aperture diaphragm 54 is driven by an aperture diaphragm drive section 55 that includes a motor and a motor driver. The aperture diaphragm drive section 55 controls the aperture diameter of the aperture diaphragm based on aperture value data outputted from an AE/AWB processing section 63.

A shutter 56 is a mechanical shutter, and is driven by a shutter drive section 57 which includes a motor and a motor driver. The shutter drive section 57 performs open/close control of the shutter 56 based on a depressed signal of the shutter 19 and shutter speed data outputted from the AE/AWB processing section 63.

A CCD 58, which is an image sensor, is provided on the rear side of the optical system. The CCD 58 has a photoelectric surface that includes multitudes of light receiving elements disposed two-dimensionally, and the light representing a subject image transmitted through the optical system is focused on the photoelectric surface and subjected to a photoelectric conversion. A microlens array for directing light to respective pixels, and a color filter array including R, G, and B filters arranged regularly are disposed in front of the photoelectric surface. The CCD 58 reads out charges stored in the respective pixels line by line in synchronization with a vertical transfer clock signal and a horizontal transfer clock signal supplied from a CCD control section 59, and outputs the charges as serial analog image signals. The charge storage time of each pixel, that is, exposure time is determined by an electronic shutter drive signal supplied from the CCD control section 59. The CCD 58 is gain adjusted by the CCD control section 59 so that analog image signals having a predetermined level is obtained.

The analog image signals outputted from the CCD 58 are inputted to an analog signal processing section 60. The analog signal processing section 60 includes: a correlated double sampling circuit (CDS) for removing noise from the analog signals; an automatic gain controller (AGC) for controlling the gain of the analog signals; and an A/D converter (ADC) for converting the analog signals to digital signals. The image data converted to digital signals are CCD-RAW data in which each pixel has RGB density values.

A timing generator 72 is a generator for generating timing signals, which are inputted to the shutter drive section 57, CCD control section 59, analog signal processing section 60, thereby the operation of the release button, open/close of the shutter 56, charge acquisition of the CCD 58, and the processing of the analog signal processing section 60 are synchronized.

A flash control section 73 causes a flash 24 to emit light at the time of imaging. More specifically, if forced mode or automatic mode is selected as the flash emission mode, and a pre-image, to be described later, is darker than a predetermined brightness, the flash 24 is turned on and caused to emit light therefrom when imaging. On the other hand, if inhibit mode is selected as the flash emission mode, light emission from the flash 24 is inhibited at the time of imaging.

An image input controller 61 writes the CCD-RAW data, inputted from the analog signal processing section 60, into a frame memory 66.

The frame memory 66 is a work memory used when various types of digital image processing (signal processing) are performed on the image data, and may be, for example, a SDRAM (Synchronous Dynamic Random Access Memory) that performs data transfer in synchronization with a bus clock signal having a constant frequency.

A display control section 71 is a control section for causing a liquid crystal monitor 18 to display the image data stored in the frame memory 66 as a through image, or to display image data stored in the recording medium 70 when in playback mode. The through image is obtained by the CCD 28 at predetermined time intervals.

The AF processing section 62 and AWB processing section 63 determine an imaging condition based on a pre-image. The pre-image is an image based on the image data stored in the frame memory 66 as a result of pre-imaging performed by the CCD 58, which is caused by a CPU 75 that detects a halfway depressed signal generated when the release button is depressed halfway.

The AF processing section 62 detects the focus position based on the pre-image, and outputs focus drive amount data (AF processing). As for the method for detecting the focus position described above, the passive system may be used, which detects an in-focus position by making use of the fact that image contrast becomes high when a desired subject is focused.

The AE/AWB processing section 63 measures luminance of the subject based on the pre-image, determines the aperture value, shutter speed, and the like, and outputs aperture value data and shutter speed data (AE processing), as well as automatically adjusting the white balance at the time of imaging (AWB processing). Note that the exposure and white balance may be manually set by a photographer of the digital camera 1 when the imaging mode is set to manual mode. Further, even in a case where the exposure and white balance is set automatically, the operator may give instructions through the operation system 10 to manually adjust the exposure and white balance.

The image processing section 64 performs image quality corrections, such as, tone correction, sharpness correction, color correction, and the like on the image data of a real image. In addition, it performs YC processing in which CCD-RAW data are converted to Y data, which are luminance signal data, and YC data that include Cb data, which are blue chrominance difference signals, and Cr data, which are red chrominance difference signals. The referent of "real image" as used herein means an image based on the image data stored in the frame memory 66 which are obtained by the CCD 58 when the release button is fully depressed and outputted therefrom as image signals and stored in the frame memory through the analog signal processing section 60 and the image input controller 61. The upper limit of the number of pixels of the real image is dependent on the number of pixels of the CCD 58. But the number of pixels for recording may be changed, for example, through fine or normal setting, or the like. In the mean time, the number of pixels for a through image or a pre-image may be less than that of a real image, e.g., 1/16 of the real image.

A compression/expansion section 65 generates, for example, a JPEG format image file by performing compression on the image data after image quality correction and conversion are performed by the image processing section 64. Tag information including auxiliary information, such as the date and time of imaging, and the like, based on, for example, Exif format or the like, is attached to the image file. Further, the compression/expansion section 65 reads out a compressed image file from the external recording medium 70 and performs expansion thereon in playback mode. The expanded image data are outputted to the liquid crystal display monitor 18.

The media control section 67 gains access to the recording medium 70 to control read/write operations of the image files.

An internal memory 68 stores various constants to be set within the digital camera 1, a program to be performed by the CPU 75, and the like.

A face detection section 80 performs a process for detecting a person's face on an image obtained through continuous imaging, and determines whether or not a face is included in the image, when the continuous imaging mode is set. As for the method for detecting a face, various known methods may be used, such as a method that detects a region having a feature of a face (e.g., having flesh color, having eyes, having a face shape, or the like) as the face region, and the like, other than the following method, in which face dictionary data representing a typical face is stored in the internal memory 68, then an image obtained by imaging is checked with the face dictionary data, and an image having a matched level (face likelihood) greater than or equal to a predetermined value is determined to include a face.

The CPU 75 controls each section of the main body of the digital camera 1 in response to the signals from various sections, including the operation system 10, AF processing section 62, and the like. In addition, when the continuous imaging mode is set, the CPU 75 controls the imaging system, including the CCD 58, such that real imaging is performed continuously to sequentially obtain a real image without the release button being depressed. Note that if the continuous imaging mode is set, pre-imaging is performed once prior to the continuous imaging in order to determine an imaging condition required for real imaging, and then the continuous imaging is performed using the determined imaging condition.

A data bus 76 is connected to the image input controller 61, various processing sections 62 to 65, frame memory 66, media control section 67, internal memory 68, display control section 71, face detection section 80, and CPU 75 to send and receive digital image data and the like through the bus.

A process performed in the digital camera 1 constructed in the manner as describe above will now be described. FIG. 2 is a flowchart illustrating a process performed in the first embodiment. When the operation mode of the digital camera 1 is set to continuous imaging mode, the process is initiated by the CUP 75 and real imaging is performed (step ST1). Then, the face detection section 80 performs face detection on a real image obtained by the real imaging (step ST2), and determines whether or not a face is included in the image (step ST3).

If step ST3 is negative, the process returns to step ST1, and the process sequence from step ST1 onward is repeated. This results in continuous imaging to be performed. If step ST3 is positive, the imaging is terminated and a real image determined to include a face is recorded on the recording medium 70 (step ST4), thereafter the process is terminated.

In this way, in the first embodiment, a determination is made as to whether or not a face is included in an image obtained in the continuous imaging mode, and if the image is determined to include a face, then the image is recorded on the recording medium 70, and the process is terminated. This eliminates the time lag from the time when the condition that the image should include a face is satisfied to the time when the imaging is actually performed. As a result, an image including a face may be obtained reliably.

In particular, when performing a self-image taking by directing the digital camera 1 toward oneself, an image that includes one's face may be obtained reliably.

Next, a second embodiment of the present invention will be described. The second embodiment differs from the first embodiment, in that it performs the following: the number of persons to be included in an image is set through the operation system 10; detection of the number of faces included in an image is performed in the face detection section 80, in addition to face detection; and, in the continuous imaging mode, an image including the number of faces corresponding to the specified number of persons is recorded on the recording medium 70.

FIG. 3 illustrates a screen for setting the number of persons displayed on the liquid crystal display monitor. As illustrated, a headcount setting screen 100 displays a text 102 that reads "Select Number of Persons", three icons 104A, 104B, and 104C for setting one, two, and three or more persons respectively, and three input buttons 106A, 106B, and 106C corresponding to the icons 104A, 104B, and 104C respectively. The photographer may set the number of persons to be included in an image by selecting an input button corresponding to the icon indicating the desired number of persons from the icons 104A, 104B, and 104C.

FIG. 4 is a flowchart illustrating a process performed in the second embodiment. When the operation mode of the digital camera 1 is set to continuous imaging mode, the process is initiated by the CUP 75 and real imaging is performed (step ST11). Then, the face detection section 80 performs face detection on a real image obtained through the real imaging (step ST12), and determines whether or not a face is included in the image (step ST13).

If step ST13 is negative, the process returns to step ST11, and the process sequence from step ST11 onward is repeated. If step ST13 is positive, a determination is made as to whether or not the number of detected faces corresponds to the specified number of persons (step ST14). If step ST14 is negative, the process returns to step ST11 and the process sequence from step ST11 onward is repeated. If step ST14 is positive, the imaging is terminated, and a real image determined to include the number of faces corresponding to the specified number of persons is recorded on the recording medium 70 (step ST 15), thereafter the process is terminated.

This ensures that, in the second embodiment, an image including the specified number of persons to be obtained.

Next, a third embodiment of the present invention will be described. FIG. 5 is a schematic block diagram of a digital camera to which the imaging apparatus according to the third embodiment of the present invention is applied, illustrating the construction thereof. In the third embodiment, elements identical to those used in the first embodiment are given the same reference numerals and will not be elaborated upon further here. A digital camera 1A according to the third embodiment of the present invention differs from the first embodiment, in that it includes a shake detection section 82 for detecting an amount of image shake, and, in the continuous imaging mode, an image determined to include a face with less amount of image shake is recorded on the recording medium 70.

Here, a shaken image caused by a camera shake or the like includes a less amount of high frequency component. The shake detection section 82 performs filtering on an image determined to include a face using a high-pass filter, and if an output value (high frequency component) obtained through the filtering is greater than a predetermined threshold value Th1, the amount of image shake is determined to be small. The referent of "amount of image shake is small" as used herein means that the amount of image shake is smaller than a threshold value Th2 corresponding to the threshold value Th1.

Determination as to whether or not the amount of image shake is small may be made on an entire image determined to include a face, or only on a face region including the detected face, since the face is already detected. This may reduce the calculation time for determining whether or not the amount of image shake is small.

FIG. 6 is a flowchart illustrating a process performed in the third embodiment. When the operation mode of the digital camera 1A is set to continuous imaging mode, the process is initiated by the CUP 75 and real imaging is performed (step ST21). Then, the face detection section 80 performs face detection on a real image obtained by the real imaging (step ST22), and determines whether or not a face is included in the image (step ST23).

If step ST23 is negative, the process returns to step ST21, and the process sequence from step ST21 onward is repeated. If step ST23 is positive, the shake detection section 82 performs shake detection (step ST24) and determines whether or not the amount of image shake is small (step ST25). If step ST25 is negative, the process returns to step ST21 and the process sequence from step ST21 onward is repeated. If step ST25 is positive, the imaging is terminated, and an image determined to have a less amount of image shake is recorded on the recording medium 70 (step ST26), thereafter the process is terminated.

This ensures that, in the third embodiment, an image including a face with a less amount of image shake to be obtained.

Next, a fourth embodiment of the present invention will be described. The fourth embodiment differs from the third embodiment, in that it performs the following: the number of persons to be included in an image is set through the operation system 10; detection of the number of faces included in an image is performed in the face detection section 80, in addition to face detection; and, in the continuous imaging mode, an image from which a face is detected, determined to include the number of faces corresponding to the specified number of persons, and determined to have a less amount of image shake is recorded on the recording medium 70.

FIG. 7 is a flowchart illustrating a process performed in the fourth embodiment. When the operation mode of the digital camera 1A is set to continuous imaging mode, the process is initiated by the CUP 75 and real imaging is performed (step ST31). Then, the face detection section 80 performs face detection on a real image obtained through the real imaging (step ST32), and determines whether or not a face is included in the image (step ST33).

If step ST33 is negative, the process returns to step ST31, and the process sequence from step ST31 onward is repeated. If step ST33 is positive, a determination is made as to whether or not the number of detected faces corresponds to the specified number of persons (step ST34). If step ST34 is negative, the process returns to step ST31 and the process sequence from step ST31 onward is repeated.

If step ST34 is positive, the shake detection section 82 performs shake detection (step ST35) and determines whether or not the amount of image shake is small (step ST36). If step ST36 is negative, the process returns to step ST 31 and the process sequence from step ST31 onward is repeated. If step ST36 is positive, the imaging is terminated, and an image determined to include the number of faces corresponding to the specified number of persons and to have a less amount of image shake is recorded on the recording medium 70 (step ST37), thereafter the process is terminated.

This ensures that, in the fourth embodiment, an image including the specified number of persons with a less amount of image shake to be obtained.

Next, a fifth embodiment of the present invention will be described. FIG. 8 is a schematic block diagram of a digital camera to which the imaging apparatus according to the fifth embodiment of the present invention is applied, illustrating the construction thereof. In the fifth embodiment, elements identical to those used in the first embodiment are given the same reference numerals and will not be elaborated upon further here. A digital camera 1B according to the fifth embodiment differs from the first embodiment, in that it does not includes the face detection section 80, but includes the shake detection section 82 for detecting an amount of image shake, and, in the continuous imaging mode, an image with a less amount of image shake is recorded on the recording medium 70.

FIG. 9 is a flowchart illustrating a process performed in the fifth embodiment. When the operation mode of the digital camera 1B is set to continuous imaging mode, the process is initiated by the CUP 75 and real imaging is performed (step ST41). Then, the shake detection section 82 performs shake detection (step ST42), and determines whether or not an amount of image shake is small (step ST43). If step ST43 is negative, the process returns to step ST41 and the process sequence from step ST41 onward is repeated. If step ST43 is positive, the imaging is terminated, and an image determined to have a less amount of image shake is recorded on the recording medium 70 (step ST44), thereafter the process is terminated.

This ensures that an image with a less amount of image shake is obtained.

Next, a sixth embodiment of the present invention will be described. The sixth embodiment differs from the first embodiment, in that an image determined to include a face is displayed on the liquid crystal monitor 18, then an instruction as to whether or not to record the displayed image is accepted from the operator, and if instructed to record the image, the image is recorded on the recording medium, while instructed not to record the image, the imaging is continued.

FIG. 10 is a flowchart illustrating a process performed in the sixth embodiment. When the operation mode of the digital camera 1 is set to continuous imaging mode, the process is initiated by the CUP 75 and real imaging is performed (step ST51). Then, the face detection section 80 performs face detection on a real image obtained through the real imaging (step ST52), and determines whether or not a face is included in the image (step ST53).

If step 53 is negative, the process returns to step ST51, and the process sequence from step ST51 onward is repeated. If step ST53 positive, an image determined to include a face is displayed on the liquid crystal monitor 18 (step ST54). FIG. 11 illustrates an image display screen of the liquid crystal monitor 18.

As illustrated, the image display screen 110 includes an image 112 determined to include a face, a record button 114A for giving an instruction to record a displayed image, and a cancel button 114B for giving an instruction not to record a displayed image. The photographer, while looking at the displayed image 112, selects the record button 114A through the operation system 10 if intends to record the image, or selects the cancel button 114B through the operation system 10 if intends not to record the image.

Then, a determination is made by the CPU 75 as to whether a cancel instruction instructing not to record the image is given by the photographer by selecting the cancel button 114B (step ST55). If the step ST55 is positive, the process returns to step ST51, and the process sequence from step ST51 onward is repeated. If the step ST55 is negative, a determination is made as to whether or not an instruction to record the image is given by the photographer by selecting the record button 114A (step ST56). If step ST56 is negative, the process returns to step ST55, and the process sequence from step ST55 onward is repeated. If the step ST56 is positive, the imaging is terminated, and the displayed image is recorded on the recording medium (step ST57), thereafter the process is terminated.

This ensures that, in the sixth embodiment, an image desired by the photographer to be recorded on the recording medium 70.

Here, the arrangement of displaying a real image to allow the photographer to make selections as to whether or not to record the displayed image described in the sixth embodiment may also be applied to the second to five embodiments, as well as the first embodiment. That is, an image including the determined number of persons in the second embodiment, an image including a face with a less amount of image shake in the third embodiment, an image including the determined number of persons with a less amount of image shake in the fourth embodiment, or an image with a less amount of image shake in the fifth embodiment may be displayed to allow the photographer to make selections as to whether or not to record the displayed image, thereby an image desired by the photographer may be recorded on the recording medium 70.

Figure 12A:
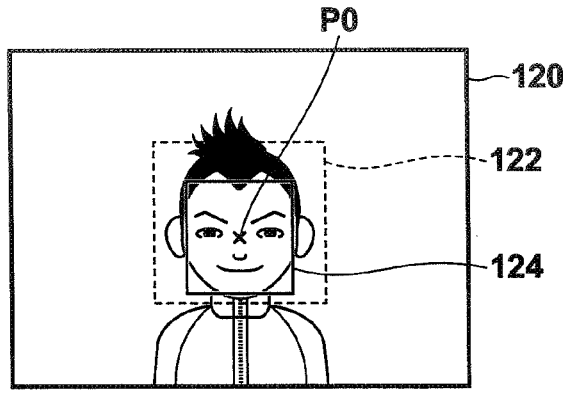
FIGS. 12A and 12B illustrate how to determine whether or not a face is included (first example).
Figure 12B:
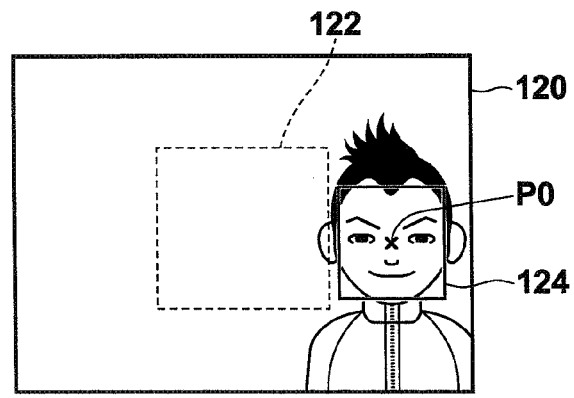

The face detection section 80 in the embodiments described above determines that a face is included in an image if it is detected regardless of the position of the face within the image. But a configuration may be adopted in which an image is determined to include a face when a face is detected and the detected face is positioned in a predetermined position within the image. More specifically, a region 122 is set in the central portion of an image 120, and if a center P0 of a detected face region 124 is included in the region 122, then the image is determined to include a face, as illustrated in FIG. 12A. If the center P0 of the face region 124 is outside of the region 122, then the image is determined not to include the face, as illustrated in FIG. 12B.

Figure 13A:
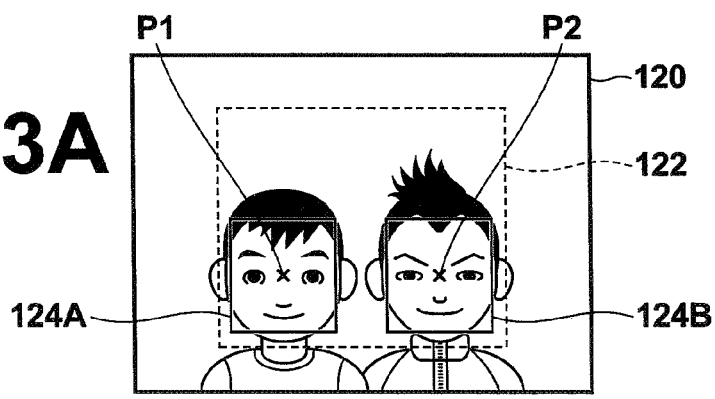
FIGS. 13A and 13B illustrate how to determine whether or not a face is included (second example).
Figure 13B:
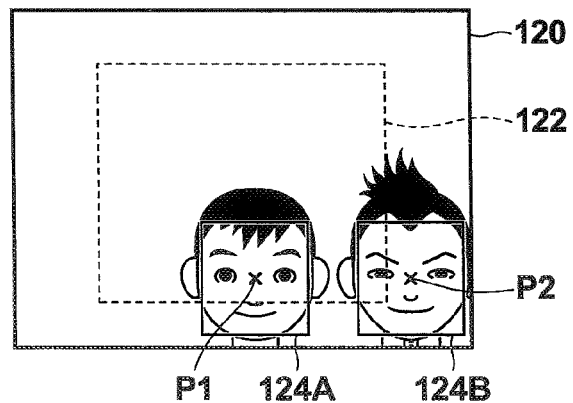

In particular, when the number of persons is set as in the second and fourth embodiments, it is preferable that the size of the region 122 be changed according to the specified number of persons. For example, it is preferable that the size of the region 122 be enlarged as the number of persons is increased. More specifically, when two persons are set as the number of persons, if both the center P1 of a face region 124A and the center P2 of a face region 124B are positioned within the region 122, then the image is determined to include the faces, as illustrated in FIG. 13A. If either one of the centers P1 and P2 of the two faces is positioned outside of the region 122 (P2, here), then the image is determined not to include the faces.

Figure 14A:
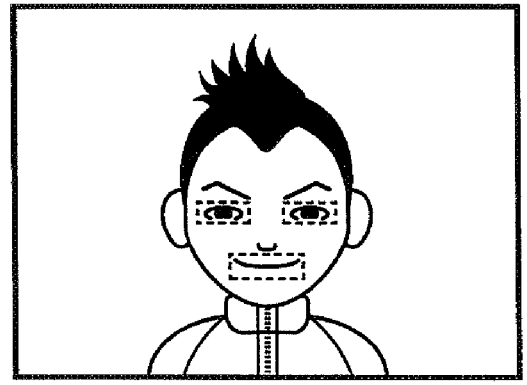
FIGS. 14A to 14C illustrate how to determine whether or not a face is included (third example).
Figure 14B:
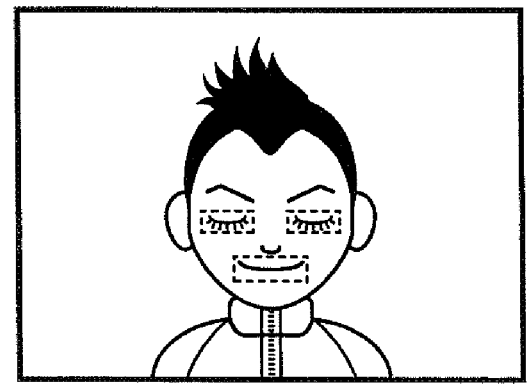
Figure 14C:
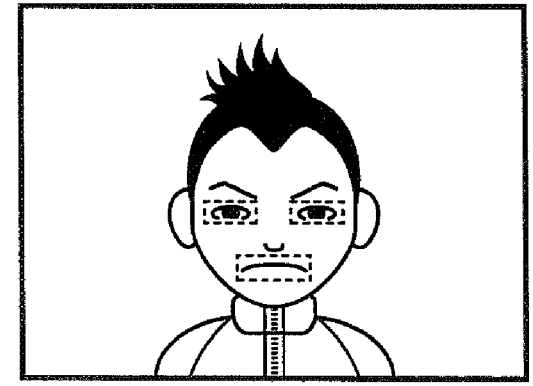

The face detection section 80 may be a face detection section that extracts face components, such as eyes, a mouth, and the like from a face region, if a face is detected from an image, and determines that the image includes the face if the extracted face components have predetermined shapes. For example, when eyes and a mouth are extracted, if the eyes are open and the mouth has a downward convex shape, that is, a smiling face, as illustrated in FIG. 14A, the face detection section determines that the image include a face. If the eyes are closed as illustrated in FIG. 14B, or if the mouth has an upward convex shape, as illustrated in FIG. 14C, the face detection section determines that the image does not include a face. This allows a good expressive face to be obtained.

So far, digital cameras according to the embodiments of the present invention have been described. A program for causing a computer to function as the means corresponding to the face detection section 80 and shake detection section 82, thereby causing the computer to execute processes like those illustrated in FIGS. 2, 4, 6, 7, 9, and 10 is another embodiment of the present invention. Further, a computer readable recording medium on which such program is recorded is still another embodiment of the present invention.

What is claimed is:

1. An imaging apparatus, comprising:
    an imaging means for obtaining an image by imaging;
    a recording means for recording the image;
    a face detecting means for determining whether faces are included within a center area of the image;
    an operation means for accepting various setting operations, including setting of a continuous imaging mode, performed by a photographer, and accepting input of the number of persons included in the image; and
    a control means for controlling the imaging means and the recording means when the continuous imaging mode is set through the operation means so that the following are performed: obtaining images by continuous imaging; and recording images among the images obtained by the continuous imaging, in which the face detection means determines that faces are included, in the recording means;
    the face detecting means setting the center area of the image to be greater as the number of persons included in the image set through the operation means increases, and determining that the faces are included in the image in cases that the centers of faces corresponding to the number of persons are positioned within the center area.

2. The imaging apparatus according to claim 1, wherein the face detection means is a means for detecting a face component of a face included in the image, and determining that the image includes the face if the face component has a predetermined shape.

3. An imaging apparatus as defined in claim 2, wherein:
    the face detecting means determines that the image includes a face, in cases that the eyes, which are face components, are open and the mouth, which is another face component, is of a downwardly convex shape.

4. The imaging apparatus according to claim 1, wherein:
    the apparatus further comprises a display means for displaying the image; and
    the control means is a means for causing the display means to display the image to be recorded on the recording means to accept an instruction as to whether or not to record the displayed image on the recording medium, and causing the image to be recorded on the recording medium if instructed to record the image, while causing the imaging to be continued if instructed not to record the image.

5. An imaging method for use with an imaging apparatus that includes an imaging means for obtaining an image through imaging, and a recording means for recording the image, the method comprising the steps of:
    obtaining an image through continuous imaging when a continuous imaging mode is set by a photographer;
    determining whether faces are included within a center area of the image;
    accepting input of the number of persons included in the image;
    recording images among the images obtained by the continuous imaging when faces are included from the determining step; and
    setting the center area of the image to be greater as the number of persons included in the image, and determining that the faces are included in the image in cases that the centers of faces corresponding to the number of persons are positioned within the center area.

6. An imaging method according to claim 5, wherein detecting the faces comprises detecting a face component of a face included in the image, and determining that the image includes the face if the face component has a predetermined shape.

7. An imaging method according to claim 6, wherein detecting the face comprises determining that the image includes a face, in cases that the eyes, which are face components, are open and the mouth, which is another face component, is of a downwardly convex shape.

8. An imaging method according to claim 5, further comprising:
  displaying the image; and
  causing the display means to display the image to be recorded to accept an instruction as to whether or not to record the displayed image on a recording medium, and causing the image to be recorded on the recording medium if instructed to record the image, while causing the imaging to be continued if instructed not to record the image.

9. A tangible computer readable recording medium having a program recorded thereon for causing a computer to execute an imaging method for use with an imaging apparatus that includes an imaging means for obtaining an image through imaging, and a recording means for recording the image, the method comprising the steps of:
  obtaining an image through continuous imaging when a continuous imaging mode is set by a photographer;
  determining whether faces are included within a center area of the image;
  accepting input of the number of persons included in the image;
  recording images among the images obtained by the continuous imaging when faces are included from the determining step; and
  setting the center area of the image to be greater as the number of persons included in the image, and determining that the faces are included in the image in cases that the centers of faces corresponding to the number of persons are positioned within the center area.

10. A computer readable recording medium according to claim 9 wherein detecting the faces comprises detecting a face component of a face included in the image, and determining that the image includes the face if the face component has a predetermined shape.

11. A computer readable recording medium according to claim 10, wherein detecting the face comprises determining that the image includes a face, in cases that the eyes, which are face components, are open and the mouth, which is another face component, is of a downwardly convex shape.

12. A computer readable medium according to claim 9, further comprising:
  displaying the image; and
  causing the display means to display the image to be recorded to accept an instruction as to whether or not to record the displayed image on a recording medium, and causing the image to be recorded on the recording medium if instructed to record the image, while causing the imaging to be continued if instructed not to record the image.

* * * * *